United States Patent [19]

Kukimoto

[11] Patent Number: 4,840,210
[45] Date of Patent: Jun. 20, 1989

[54] HEAVY DUTY PNEUMATIC RADIAL TIRES
[75] Inventor: Takashi Kukimoto, Kodaira, Japan
[73] Assignee: Bridgestone Corporation, Tokyo, Japan
[21] Appl. No.: 81,788
[22] Filed: Aug. 5, 1987
[30] Foreign Application Priority Data Aug. 6, 1986 [JP] Japan .................. 61-183454

[51] Int. Cl.$^4$ ................................................. B60C 3/06
[52] U.S. Cl. ................................. 152/209 A; 152/456
[58] Field of Search ............... 152/209 R, 209 A, 454, 152/455, 456, 538

[56] References Cited

U.S. PATENT DOCUMENTS

| | | | |
|---|---|---|---|
| Re. 26,713 | 11/1969 | Mirtain et al. | 152/455 |
| 3,155,135 | 11/1964 | Klenk | 152/456 X |
| 3,286,756 | 11/1966 | Ellenrieder et al. | 152/209 A |
| 3,410,329 | 11/1968 | Bezbatchenko, Jr. | 152/209 R |
| 3,554,259 | 1/1971 | Webb | 152/456 X |
| 3,765,468 | 10/1973 | Verdier | 152/209 A |
| 4,442,879 | 4/1984 | Uemura | 152/209 R |

FOREIGN PATENT DOCUMENTS

| | | | |
|---|---|---|---|
| 55-156703 | 12/1980 | Japan | 152/454 |
| 61-191402 | 8/1986 | Japan | 152/454 |

Primary Examiner—Raymond Hoch
Attorney, Agent, or Firm—Sughrue, Mion, Zinn, Macpeak & Seas

[57] ABSTRACT

A pneumatic radial tires having a tread of an asymmetrical profile are disclosed. A circumferential location at which a tread takes its maximum outer diameter is deviated from a tire equator outwardly opposite to a side on which the tire is to be mounted to a vehicle, by a distance L equal to a range from 0.05 to 0.30 times as long as a width W of the tread. A ratio of $d_2/d_1$ is set at a range from 0.98 to 1.00 in which $d_1$ and $d_2$ are diameters of shoulders of the tread on the mounted tire outer side and mounted tire inner side, respectively. The tires are free from uneven wear such as shoulder drop uneven wear, river wear and one side wear.

7 Claims, 9 Drawing Sheets

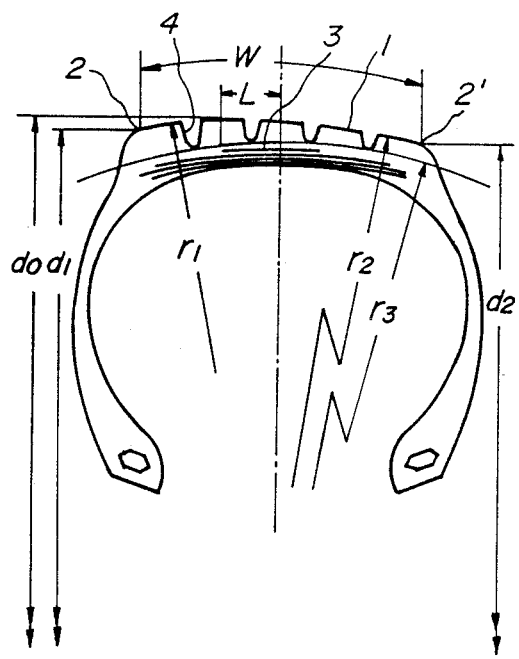
FIG_1

FIG_2a
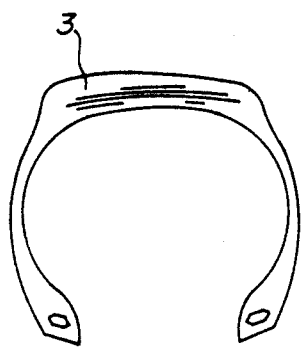
FIG_2b
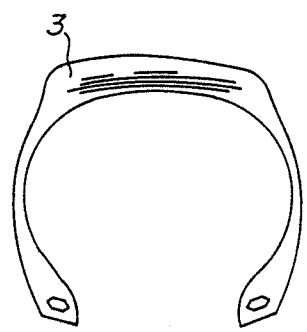
FIG_2c
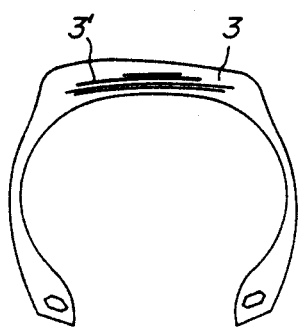
FIG_2d
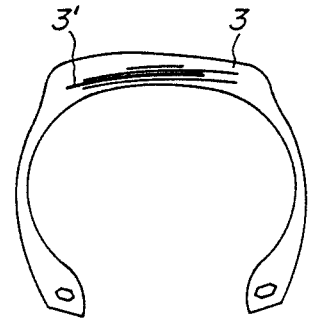
FIG_2e
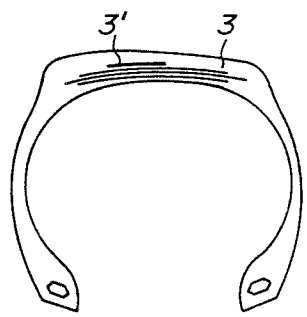

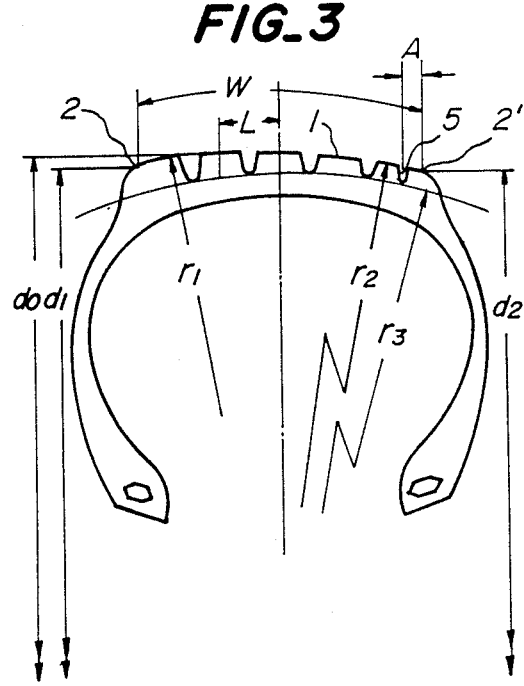
FIG_3
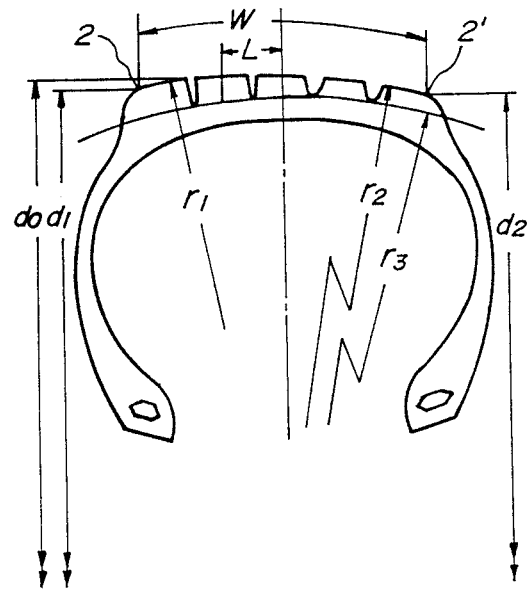
FIG_4

FIG_5
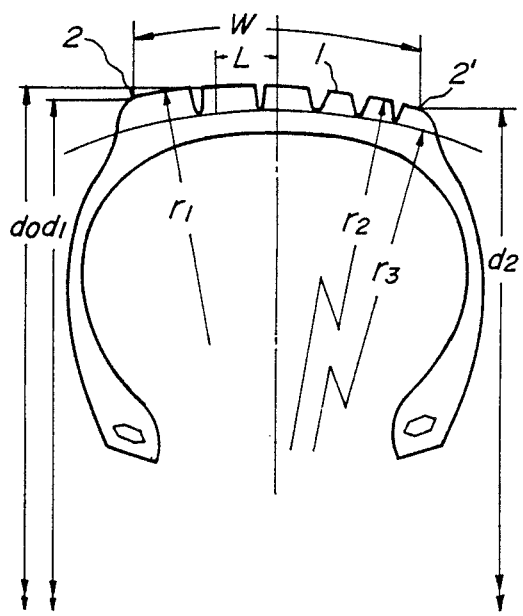

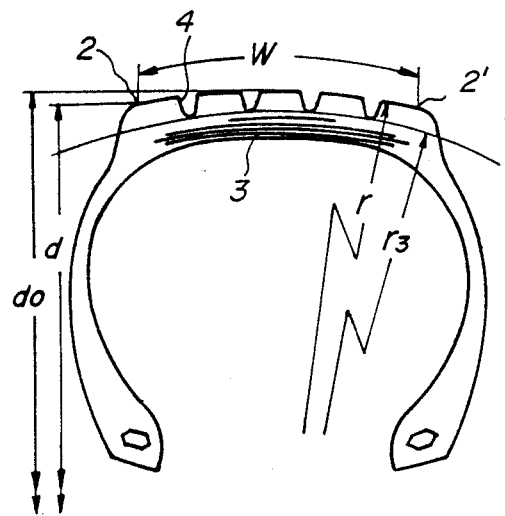
FIG_6a
PRIOR ART
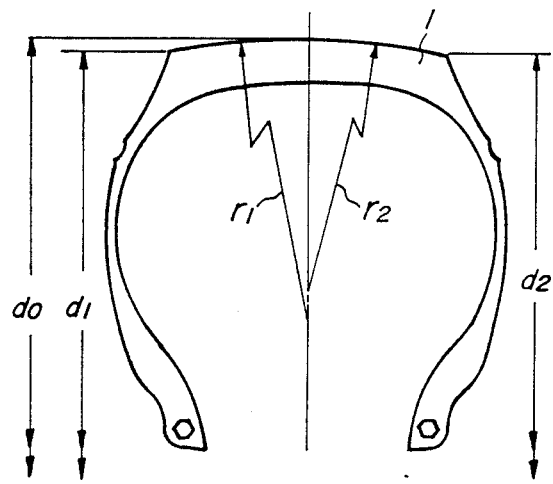
FIG_6b
PRIOR ART

FIG_7a
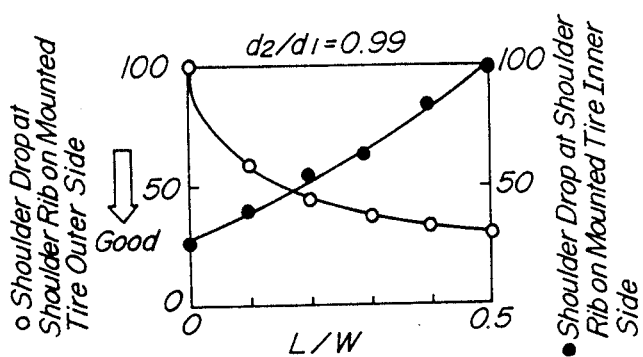
FIG_7b
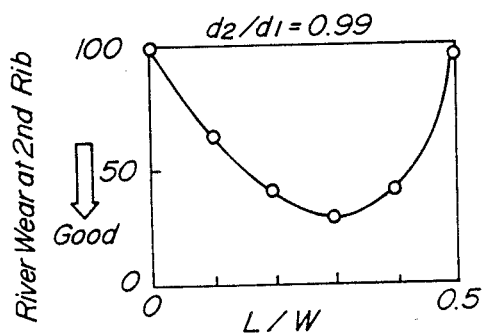
FIG_7c
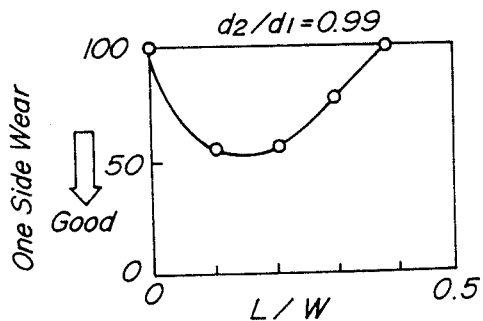

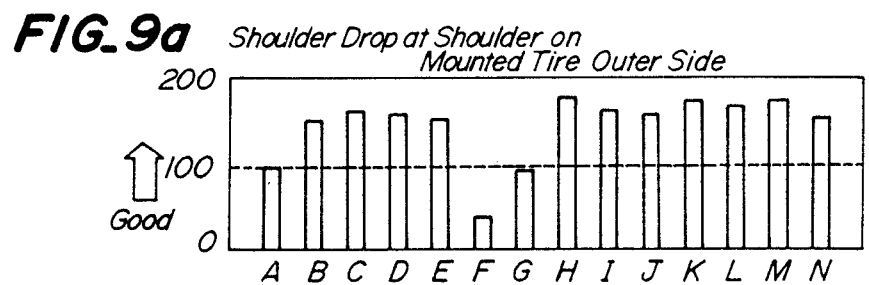
FIG_9a Shoulder Drop at Shoulder on Mounted Tire Outer Side
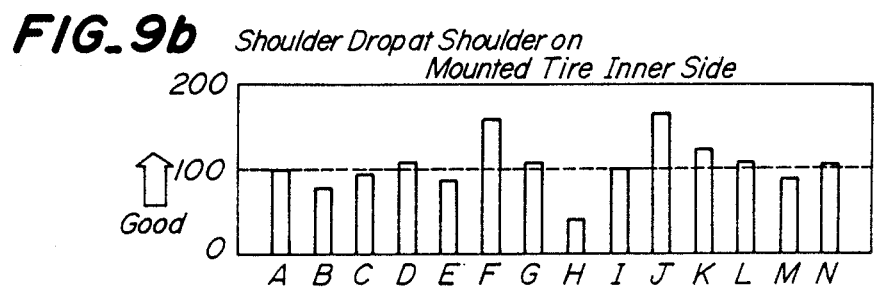
FIG_9b Shoulder Drop at Shoulder on Mounted Tire Inner Side
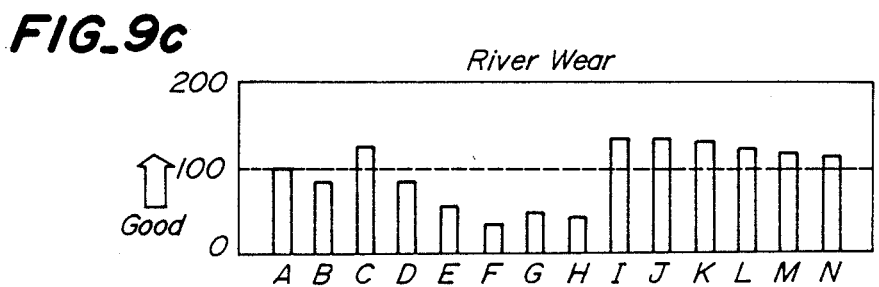
FIG_9c River Wear
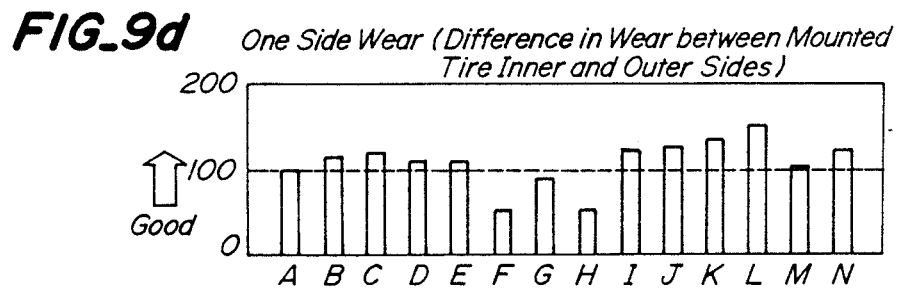
FIG_9d One Side Wear (Difference in Wear between Mounted Tire Inner and Outer Sides)

FIG_10a
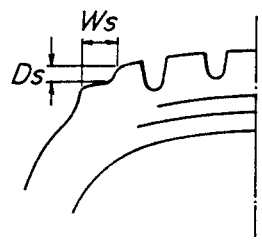
FIG_10b
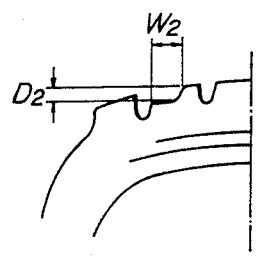

HEAVY DUTY PNEUMATIC RADIAL TIRES

BACKGROUND OF THE INVENTION (1) Field of the Invention

The present invention relates to an improvement of the tread profile of heavy duty pneumatic radial tires for use in heavy duty vehicles such as trucks and buses to obviate shoulder drop uneven wear and railway wear of the tires.

(2) Related Art Statement

In heavy duty pneumatic radial tires used in heavy vehicles such as trucks and buses, a shoulder drop uneven wear frequently occurs on outer sides of tires mounted (hereinafter referred to as "mounted tire outer sides") at front wheels. When this is attempted to be avoided, railway wear called river wear disadvantageously tends to occur.

The profile of treads of heavy duty pneumatic radial tires is generally designed in a bilaterally symmetrical shape. In such a case, the above-mentioned shoulder drop uneven wear frequently occurs at outer sides of the front wheel tires of the vehicle. To cope with this problem, a ground contact pressure at shoulder portions of the tread is increased by enlarging a crown radius, that is, a radius of curvature of a tread contour curve. However, wearing degree differs between a side on which the tire is mounted to the vehicle (hereinafter referred to as "mounted tire inner side") and the mounted tire outer side due to a difference in a reaction force at a time of ground contacting therebetween, so that a satisfactory effect can not be obtained.

Although an asymmetrical radius type crown in which the radius of curvature is made large on the mounted tire outer side than that on the mounted tire inner side with respect to a tire equator is described in Japanese patent application Laid-open No. 179,304/1985. However, while this technique is advantageous to reduce shoulder drop uneven wear, the ground contact pressure of a rib adjoining to the shoulder rib tends to lower, thereby readily resulting in river wear.

As the case may be, a so-called one side wear by which only the mounted tire outer side is worn takes place depending upon running conditions. In addition, wondering (a phenomenon that a handle is caught when a vehicle is running along an inclined surface such as a rotted road) performance is damaged.

SUMMARY OF THE INVENTION

It is an object of the present invention to realize a drastic improvement of the profile of asymmetrical treads of a heavy duty pneumatic radial tires, which advantageously and assuredly reduces shoulder drop uneven wear without being accompanied by other disadvantages such as river wearing.

The heavy duty pneumatic radial tires according to the present invention are characterized by having an asymmetrical tread profile in which a circumferential location at which tread takes its maximum outer diameter is deviated from an equator of the tire, outwardly opposite to a side on which the tire is to be mounted to a vehicle, by a distance L equal to 0.05 to 0.30 times as long as a width W of the tread; and a ratio of $d_1/d_2$ is set in a range from 0.98 to 1.00 in which $d_1$ and $d_2$ are diameters of tread shoulders on the mounted tire outer side and on the mounted tire inner side, respectively.

According to the present invention, a shearing rigidity of the tread on the mounted tire outer side is made larger as compared with that on the mounted tire inner side, so that an effective countermeasure is attained to cope with a undesired lateral force.

In order to make larger the tread rigidity on the mounted tire outer side than that on the mounted tire inner side, the following countermeasures are recommended as preferred embodiments of the present invention.

The tread is reinforced with at least three belt layers, and at least one belt layer is deviated to the side of the circumferential location where the tread takes its maximum outer diameter.

A narrow groove having a width of not more than 5 mm and a depth of not less than 30% of main grooves is provided in a shoulder portion on the mounted tire inner side, preferably at a location where A/W is in a range from 0.02 to 0.15 in which A and W are a distance between an edge of the tread shoulder on the mounted tire inner side and the narrow groove, and a width of the tread, respectively.

Generally, with respect to the tire equator, an area ratio of grooves not in contact with roads at the tread surface (negative ratio) is smaller on the mounted tire outer side than that on the mounted tire inner side. Preferably, the negative ratio "a" on the mounted tire outer side is a range from 5 to 20%, and that "b" on the mounted tire inner side is in a range from 20 to 30%, a/b being from 0.3 to 0.8.

Further, the tread is provided with tread grooves having such a depth as to give an uniform skid base on the belt, thereby further improving wear resistance of the tire.

In addition, when a contour of the tread positioned on opposite sides of the circumferential location having the tread maximum outer diameter are approximated by two arcs, the radius of curvature, "$r_1$", on the mounted tire outer side is set smaller than a radius of curvature, "$r_2$", on the mounted tire inner side, thereby effectively improving wondering performance.

These and other objects, features and advantages of the present invention will be appreciated upon reading of the following description of the invention when taken in conjunction with the attached drawings, with the understanding that modifications, variations and changes of the same could be made by a skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 1 is a sectional view of a tread profile according to the present invention;

FIGS. 2(a) through (e) are schematic views illustrating reinforcements for treads;

FIG. 3 is a sectional view of a tire illustrating a narrow groove at a shoulder portion on a mounted tire inner side;

FIGS. 4 and 5 are sectional views of tires having asymmetrical negative patterns;

FIGS. 6(a) and (b) are sectional views of conventional tires;

FIGS. 7(a), (b) and (c) and 8(a), (b) and (c) are diagrams showing experimental results;

FIGS. 9(a), (b), (c) and (d) are diagrams comparing the experimental results; and FIGS. 10(a) and (b) are sectional views of tires illustrating a shoulder drop wear and river wear, respectively.

DETAILED DESCRIPTION OF THE INVENTION

Figure 8A:
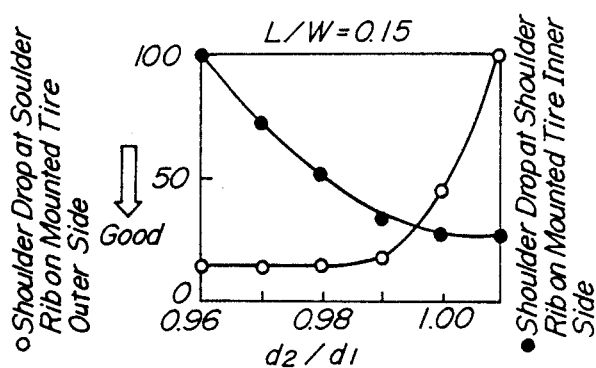

Uneven wear which occurs at tread edge portions of a tire at a front wheel takes place mainly at the tread edge portion on the mounted tire outer side rather than on the opposite sides. This is caused because roads have not only straight sections but also curved sections, that is curves. A vehicle rolls due to a centrifugal force during cornering. Accordingly, the tread edge portion of the tire mounted on an outer side of a turning center has an increased load and a concentrated lateral force. Thus, the tread edge portion on the mounted tire outer side is liable to be unevenly worn. In this way, the tire undergoes different forces depending upon the relation between the tire and the vehicle, that is, whether the mounted tire outer side or the mounted tire inner side. That is, the tread on the mounted tire outer side is more likely to be worn. On the other hand, when a radius of curvature of the tread contour is enlarged while its bilateral symmetry is maintained so as to overcome the above trouble, the tread on the mounted tire outer side is worn faster so that uneven wear such as one side wear and in worse case shoulder drop wear occurs.

According to the present invention, the tire tread is shaped to restrain occurrence of the above-mentioned one side wear, shoulder drop wear, and river wear without damaging wear resistance and to improve the wondering performance. A ground contact pressure at an outermost rib and the shoulder rib on the mounted tire outer side are increased by deviating the maximum outer diameter circumferential location from the tire equatorial plane and setting the deviated maximum diameter circumferential location side on the mounted tire outer side, so that the river wear and shoulder drop wearing can be restrained. Since the maximum outer diameter circumferential location is deviated from the tire equator onto the mounted tire outer side, it is possible to make the radius of curvature of the tread profile on the mounted tire outer side smaller than on the mounted tire inner side so that wondering performance may be improved.

In FIG. 1 is shown a section of a heavy duty pneumatic radial tire having an asymmetrical tread profile according to the present invention. In the figure, reference numerals 1, 2 and 2' and 3 denote a tread, shoulders, and a reinforcement composed of belt layers for the tread 1, respectively. The maximum outer diameter of the tread 1 and the diameters of the shoulders 2 and 2' are denoted by $d_0$, and $d_1$ and $d_2$, respectively. A ratio of W/L is set in a range from 0.05 to 0.30 in which W and L are a width of the tread and a distance between the circumferential location of the maximum outer diameter $d_0$ and the tire equator, respectively. Further, $r_1 \leq r_2$ in which $r_1$ and $r_2$ are a radii of curvature of a crown on the left side and the right side in FIG. 1, respectively. In FIG. 1, $r_3$ denotes a radius of curvature of a curve connecting bottoms of tread grooves 4. Only if the circumferential location of the maximum outer diameter $d_0$ is deviated from the tire equator, difference in the outer diameter $(d_1 - d_2)$ between the mounted tire outer side and the mounted tire inner side becomes so larger that the shoulder portion on the mounted tire inner side is more liable to be unevenly worn. Thus, $d_2/d_1$ is set in a range from 0.98 to 1.00. Of L/W in a range from 0.05 to 0.30, about 0.15 is particularly preferable.

Since the crown profile of the tread 1 is asymmetrical as mentioned above, shearing rigidity differs under application of a lateral force between the right and left sides of the tread. That is, this is because a tread gauge of the tread on the mounted tire outer side is greater and an axial shearing rigidity per unit width is smaller on the mounted tire outer side than on the mounted tire inner side. Consequently, a deformed amount of the tread on the mounted tire outer side becomes larger due to the lateral force, so that it is worn faster. Therefore, wear resistance can be prevented from lowering by uniformly wearing the tread through increasing the shearing rigidity of the tread on the mounted tire outer side as compared with the mounted tire inner side.

Various embodiments in which belt layers of the reinforcement 3 for the tread 1 are set off the tire equator are possible. FIGS. 2(a) to (e) show several embodiments. For example, an innermost layer or an outermost layer as viewed from a carcass (not shown) of a tire is designed in a center-omitted layer and widths of opposite side reinforcements of this layer are made different [FIG. 2(a)]. The outermost or innermost layer is deviated [FIG. 2(b)]. At least one intermediate layer is deviated [FIGS. 2(c) and (d)]. Only the outermost layer is deviated [FIG. 2(e)]. In FIGS. 2(c) through (e), the belt arranged off the tire center is shown by a thickened line 3'.

FIG. 3 shows an embodiment in which the rigidity of the tread on the mounted tire outer side is made relatively larger by providing a narrow groove 5 in the tread on the mounted tire inner side. A distance A between the shoulder 2' on the mounted tire inner side and the narrow groove is preferably in a range from 0.02 to 0.15 time as long as the width W of the tread.

FIGS. 4 and 5 show embodiments in which the negative ratio of the tread on the mounted tire outer side is made smaller than that on the mounted tire inner side to make the rigidity of the tread on the mounted tire outer side larger than that on the mounted tire inner side.

For comparison purpose, a conventional ordinary heavy duty pneumatic radial tire having a bilateral symmetry in a tire section as shown in FIG. 6(a) was taken as a control, and tests were carried out in a room to examine how uneven wear occurred when L/W and $d_2/d_1$ were varied. Test results are shown in FIGS. 7 and 8.

FIG. 7 shows an influence of varied L/W upon uneven wear at $d_2/d_1 = 0.99$. Judging from FIGS. 7(a), (b) and (c) together, it is seen that a range of $L/W = 0.05$ to 0.30 yields good results.

Figure 8B:
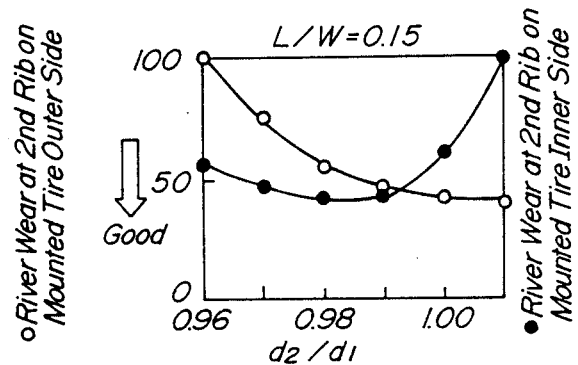
Figure 8C:
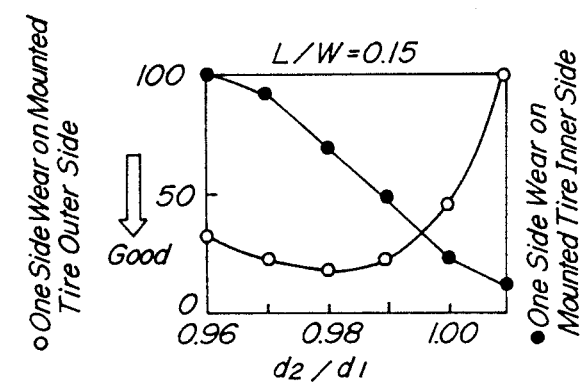

In FIGS. 8(a) through (c), uneven wear is shown when $d_2/d_1$ was varied at a fixed $L/W = 0.15$. Judging from the FIGS. 8(a), (b) and (c), it is seen that a range of $d_2/d_1$ yields good results.

FIGS. 7(a) and 8(a) and FIGS. 7(b) and 8(b) show wear work done obtained by integrating a product between a displacement of a shoulder rib (a) or a displacement of a second rib (b) and a generated force from a time at which the tread began to tread the ground to a time at which the tread kicked the road, respectively. FIGS. 7(c) and FIG. 8(c) show a difference in the wear work done between the mounted tire outer side and the mounted tire inner side.

The larger the wear work done, the larger the wear amount. The results are shown by index by taking those of the conventional tire of FIG. 6(a) as 100.

In the following, specific embodiments are described. They are merely illustrative of the invention, but should never be intended to limit the scope thereof.

Each type of test tires of FIGS. 1, 2(a) through (c), 3 through 5, and 6(a) and (b) having a tire size of 11R 22.5 16PR were attached to front wheels (at a toe-in arrangement of 3 mm) of a truck of a 2 front wheel tire and 4 rear wheel tire type, and comparison tests were carried out by actually running the truck on a running circuit consisting of 30% of general roads and 70% of high speed roads at an internal pressure of 7.75 kgf/cm$^2$ under 100% loading.

Dimensions of test tires were as follows (with respect to symbols given below, please refer to explanation of FIG. 1).

W: 190 mm, d$_o$: 1,050 mm (maximum outer diameter), r$_3$: 600 mm

With respect to Tires A, B and C, wondering performance was evaluated based on feeling during running on a rotted road. Results were obtained as follows:

(good)   C   >   A   >   B   (bad)
         +3       0       −1

As compared with conventional Tires A and B, a handle was not almost caught in Tire C and wondering performance was remarkably improved.

The heavy duty pneumatic radial tires according to the present invention can effectively avoid shoulder drop uneven wear, river wear and one side uneven wear due to a peculiar wearing phenomenon caused by a posture at which the tire is mounted to a vehicle.

As a matter of course, it goes without saying that a point at which the radius of curvature of the tread profile varies needs not always be in conformity with the circumferential location of the maximum outer diameter.

| Tire | r$_1$ mm | r$_2$ mm | L/W | d$_1$ mm | d$_2$ mm | d$_2$/d$_1$ | Remarks |
|---|---|---|---|---|---|---|---|
| A | 560 | 560 | 0 | 1033 | 1033 | 1 | conventional tire of FIG. 6(a) (control) |
| B | 700 | 470 | 0 | 1037 | 1031 | 0.994 | asymmetrical crown R of FIG. 6(b) with respect to tire center |
| C | 450 | 700 | 0.15 | 1040 | 1028 | 0.988 | |
| D | 150 | 1045 | 0.30 | 1040 | 1028 | 0.988 | |
| E | 40 | 1320 | 0.40 | 1040 | 1028 | 0.988 | |
| F | 164 | 1960 | 0.15 | 1022 | 1042 | 1.20 | |
| G | 280 | 960 | 0.15 | 1034 | 1034 | 1.00 | |
| H | 1450 | 350 | 0.15 | 1047 | 1005 | 0.96 | |
| I | 450 | 700 | 0.15 | 1040 | 1028 | 0.988 | Outermost layer set off tire center by 15 mm |
| J | " | " | " | " | " | " | Inner shoulder thin groove A/W = 0.05 |
| K | " | " | " | " | " | " | asymmetrical negative ratio a = 8%, b = 25%, a/b = 0.32 |
| L | " | " | " | " | " | " | asymmetrical negative ratio a = 17%, b = 30%, a/b = 0.57 |
| M | " | " | " | " | " | " | asymmetrical negative ratio a = 8%, b = 30%, a/b = 0.27 |
| N | " | " | " | " | " | " | asymmetrical negative ratio a = 15%, b = 17%, a/b = 0.88 |

Tires A through I had the same pattern and Tire J had a pattern with a narrow groove as shown in FIG. 3. Tires K through N had a pattern with an asymmetrical negative ratio.

After experimental running over 60,000 km, the surface of the tread was observed. Taking Tire A as control (index=100), test tires B through N were compared with respect to occurrence of uneven wear.

Results are shown in FIGS. 9(a), (b), (c) and (d).

A shoulder drop in FIGS. 9(a) and (b) is expressed by index based on a reciprocal of a product between a width Ws and a depth Ds of the shoulder rib drop measured as shown in FIG. 10(a), a result of Tire A being taken as 100.

A shoulder drop in FIG. 9(c) is expressed by index based on a reciprocal of a product between a width W$_2$ and a depth D$_2$ of the shoulder rib drop measured as shown in FIG. 10(b), a result of Tire A being taken as 100.

The one side wear of FIG. 9(d) is expressed by index based on a reciprocal of a difference in a worn amount between the mounted tire outer side and the mounted tire inner side, a result of Tire A being taken as 100.

What is claimed is:

1. A pneumatic radial tire comprising; a tread with an asymmetrical profile, wherein the tread maximum outer diameter is located spaced from the tire equatorial plane outwardly opposite to a side on which the tire is to be mounted to a vehicle by a distance L equal to a range from 0.05 to 0.30 times as long as the width W of the tread, and a ratio of d$_2$/d$_1$ is set at a range from 0.98 to 1.00 in which d$_1$ and d$_2$ are diameters of tread shoulders of the tread on a side of the tread maximum outer diameter and on the opposite side of the tread respectively, wherein when a contour of the tread positioned on opposite sides of the maximum outer diameter circumferential location in a cross section including a rotational axis of the tire is approximated by two arcs, a radius of curvature, r$_1$ of the tread contour on an outer side of the tire when being mounted onto the vehicle is smaller than a radius of curvature, r$_2$, of the tread contour on an inner side of the mounted tire, and the maximum outer diameter of the tire is greater than the diameters d$_1$ and d$_2$.

2. A pneumatic radial tire according to claim 1, wherein a shearing rigidity of the tread on the mounted tire outer side is larger than that on the mounted tire inner side.

3. A pneumatic radial tire according to claim 2, wherein the tread is reinforced by at least three belt layers, and at least one of said belt layers is displaced with respect to the tread on the side of the tread maximum outer diameter.

4. A pneumatic radial tire according to claim 2, wherein a narrow groove is provided in a shoulder portion on the mounted tire inner side, said narrow groove having a width of not more than 5 mm and a depth equal to not less than 30% of that of main grooves.

5. A pneumatic radial tire according to claim 4, wherein the narrow groove is provided in such a position that A/W is in range from 0.02 to 0.15 in which A and W are a distance between an edge of the tread shoulder on the mounted tire inner side and the narrow groove and the width of the tread, respectively.

6. A pneumatic radial tire according to claim 2, wherein the negative ratio defined as the area ratio of grooves being in no contact with roads at the tread surface is smaller on the mounted tire outer side than on the mounted tire inner side.

7. A pneumatic radial tire according to claim 6, wherein the negative ratio "a" on the mounted tire outer side is in a range from 5 to 20% and that the negative ratio "b" on the mounted tire inner side is in a range form 20 to 30%, a ratio of a/b being in a range of 0.3 to 0.8.

* * * * *